Sept. 25, 1923.  
F. A. HEADSON  
1,468,634  
LINING OR FRICTION MEMBER FOR BRAKE BANDS, BRAKE SHOES, OR OTHER ARTICLES  
Filed May 9, 1921
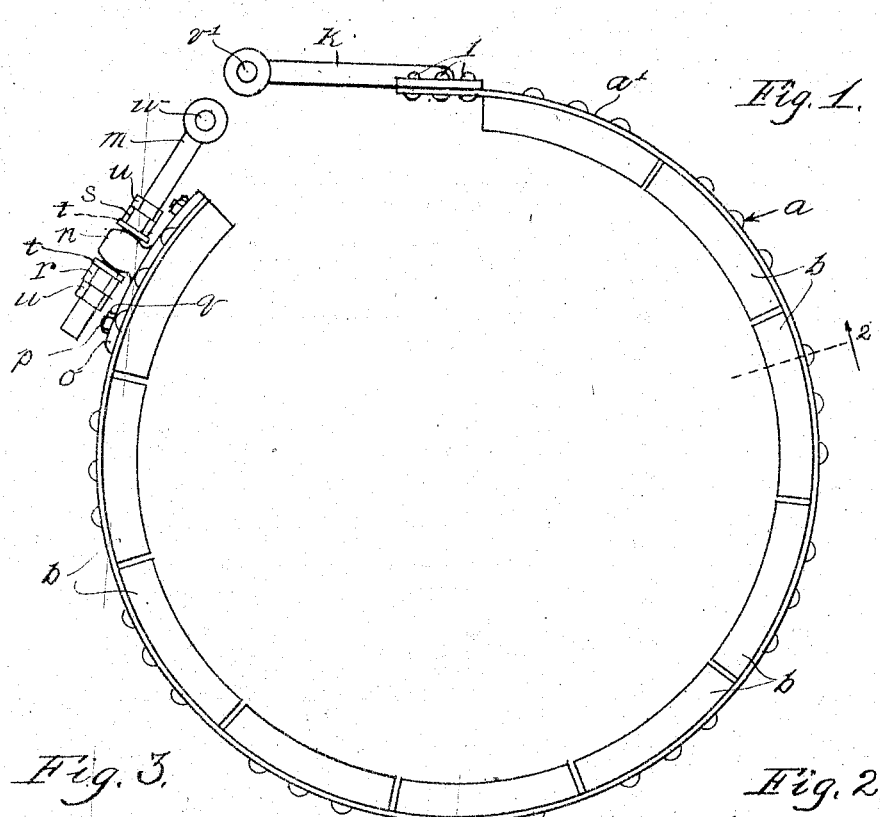
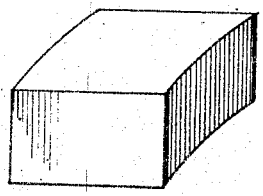
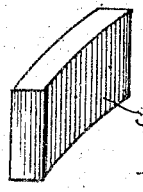
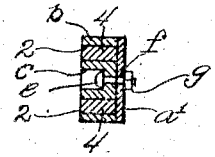
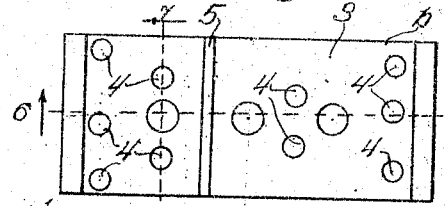
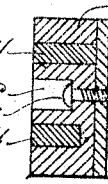
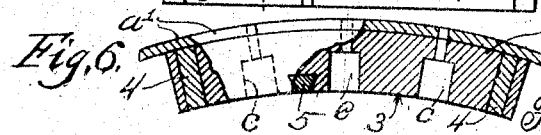
Inventor:  
Frank A. Headson  
By Harry Irwin Cromer  
Attorney Patented Sept. 25, 1923.

1,468,634

UNITED STATES PATENT OFFICE.

FRANK A. HEADSON, OF MILWAUKEE, WISCONSIN.

LINING OR FRICTION MEMBER FOR BRAKE BANDS, BRAKE SHOES, OR OTHER ARTICLES.

Application filed May 9, 1921. Serial No. 468,087.

*To all whom it may concern:*

Be it known that I, FRANK A. HEADSON, a citizen of the United States, residing in Milwaukee, in the county of Milwaukee and State of Wisconsin, have invented certain new and useful Improvements in Linings or Friction Members for Brake Bands, Brake Shoes, or Other Articles.

This invention relates to linings or friction members for brake bands, brake shoes or other articles, such, for instance, as those suitable for use upon hoists, drag-lines, or other mechanisms having a brake.

The principal object of this invention is to provide a simple, economical and efficient brake band, brake shoe, or lining or friction member for a brake band, brake shoe or similar article.

A further object of the invention is to provide a brake band, brake shoe or similar mechanism with a lining or friction member which is adapted to enable sufficient friction to be produced or obtained to afford the desired degree of resistance to the movement of a drum or other device engaged by such brake or friction member, and to provide sufficient lubrication to enable such friction to be obtained without injury to or cutting of the engaged surface of the drum or similar device the movement of which is to be controlled or retarded.

Other and further objects of the invention will appear from the following description and claims, and from an inspection of the accompanying drawings, which are made a part of this specification.

The invention consists in the features, combinations, and details of construction, and the composition and arrangement of co-acting elements and parts herein described and claimed.

In the accompanying drawings,—

Figure 1 is a view in elevation of a brake band provided with a sectional lining, shoes or friction members in the form of segmental blocks or parts constructed and adapted to operate in accordance with my invention;

Fig. 2, is a view in cross-section taken on line 2 of Fig. 1, looking in the direction of the arrow, and showing the manner of connecting the inner segmental friction members or lining with the outer metallic band or supporting members;

Fig. 3, is a perspective view of a blank or block of material of which the lining or segmental sections of the lining—when made of my preferred material, composition or elements—are to be formed, showing the mass of pulp or material as it would appear before being molded, compressed and vulcanized, and before being provided with the inserted graphite, sectile, or lubricating material or element;

Fig. 4, is a similar perspective view of a finished block or segmental section of lining material, forming a friction member of a brake band or shoe, as it would appear after the operation of molding, and the application of the required heat and pressure, and before the insertion of the graphite or lubricating element has been completed;

Fig. 5, is an inner view of the finished block or lining member shown in Fig. 4, showing the inner or friction surface of the same, and the arrangement of the inserts of graphite or lubricating material;

Fig. 6, is a top view of the lining member or shoe shown in Fig. 5, with a portion broken away and shown in longitudinal section, as it would appear taken on line 6, of Fig. 5, looking in the direction of the arrow, and Fig. 7, is a view in cross-section, taken on line 7 of Fig. 5.

In constructing a b a e band or brake shoe, or other article, provided with a friction member or lining made in accordance with my invention, I provide a suitable quantity of material consisting of or including, by preference, fibrous material and a binder of cementitious material adapted to be compressed and vulcanized.

The first mentioned element consists, by preference, of fibrous asbestos, although a relatively small portion of organic material, such as hemp, jute, or similar organic fibrous material may be used. The second mentioned element or binder consists, by preference, of cementitious material containing rubber, and may, and by preference does include a filler or body-forming material.

The body-forming material of the binder may consist of or comprise, zinc, whiting, a barium sulfate compound, such, for example as barytes, blue lead or sulphur or either of these in combination with any one or all of the other of said elements. A very desirable form of binder comprises or consists of the following elements employed, by preference, in approximately the following proportions: rubber 30%, barytes 39%, pulp 5%, lime 2%, litharge 2%, sulphur 8%, blue lead 10%, by weight.

The material or composition of which the main body of the friction member or shoe, or lining of a brake band, brake shoe or similar device is formed, thus consists of or comprises, by preference, the above mentioned elements in approximately the following proportions: fibrous material or asbestos, or the first-mentioned element, 70%; and rubber or cementitious material forming a binder, or the second-mentioned element, 30%.

The relative proportions of the above mentioned elements are by weight and may be varied to a considerable extent as desired, or as required by varying conditions. For instance, the composition may consist of 90% fiber, and 10% binder or cementitous material; or the proportions of cementitious material, preferably including rubber, may be increased to 50% of the mass, the remaining 50% consisting of fibrous asbestos or fibrous material; and the relative porportions of the elements forming the binder may also be varied to a considerable extent, and the binder may consist, substantially, or wholly, of rubber and barytes and sulphur, although I prefer to use the elements above mentioned in substantially the proportions above set forth.

The fibrous material may consist of or comprise remnants or fragments of asbestos cloth or fabric, such as that used in or produced incidentally to or during the manufacture of packing, belts, or similar articles of manufacture containing fibrous material or asbestos.

The fibrous material or asbestos, whether in the form of new or raw asbestos, or in the form of remnants or fragments of asbestos cloth or fabric, is ground or thoroughly disintegrated and reduced to a finely divided pulp-like condition, in any desired ordinary and well known manner, and is thoroughly intermixed with the binder, or with the desired quantity of rubber or cementitious material containing rubber, or with what is commonly known as rubber cement. The material, when it consists, as it often does, in part of remnants of packing, belting or other articles containing rubber, is immersed in or subjected to the action of benzine or gasoline, which serves to cut or dissolve the rubber so as to provide a suitable rubber solution, the gasoline or benzine being allowed to evaporate. The rubber solution, whether formed of remnants of packing, belting or other articles, or of new rubber, or fresh cementitious material, is intermixed with the fibrous material while the rubber or rubber solution is in a liquid or semi-vulcanized, plastic, or partially cured condition. A pulp or mass of material is thus obtained which comprises rubber or cementitious material containing rubber in a liquid, plastic or semi-vulcanized condition, and fibrous material preferably in the form of fibrous asbestos, or containing fibrous asbestos. The pulp or mass, including fibrous material and rubber, or cementitious material thus provided, is thoroughly intermixed and placed in a mold while the rubber solution is in a liquid, plastic, or semi-vulcanized condition and the mass in a plastic condition, and is subjected to pressure and to sufficient heat to vulcanize the rubber or rubber solution, as hereinafter more particularly described—the pressure and heat being sufficient and being so applied as to reduce the mass to the desired density and degree of hardness, and to the desired size and shape. A suitable quantity of bakelite may be used in lieu of any desired quantity of rubber, although I prefer rubber.

The mold may be of any desired, ordinary and well known or suitable form, provided with suitable means for applying the required pressure and sufficient heat for vulcanizing the rubber or rubber solution and hardening the mass; and it is therefore deemed unnecessary to illustrate or describe such mold in detail herein, further than to say that it should have side and end walls and upper and lower relatively movable mold plates all adapted to form a mold chamber having the shape and dimensions necessary to form the article or molded piece of the desired corresponding size and shape. The chamber formed by the mold should be of such dimensions that when the mold plates are separated the mold chamber will admit between the side and end walls and top and bottom plates, the required quantity of pulp or compressible material for forming the desired blank or body.

The required heat is applied, by preference, by admitting steam into contact with the mold plates or with the mold plates and mold during the operation of compressing the pulp or material, although it is possible to first compress the material and then, before vulcanizing it, to place it in a form, and then subject it to heat sufficient to vulcanize the rubber or cementitious material, or the mass comprising the fibrous material and cementitious material or binder. The pulp or compressed material is allowed to cool after being subjected to the required degree of heat and pressure, or to the action of steam at the required temperature and for the necessary length of time to suitably vulcanize the material. A hydraulic pressure of 5000 pounds to the square inch, applied by preference, while the material is in a heated condition, preferably at a temperature of 300° F., or thereabout, and while the material is in a plastic compressible condition, is found in practice to be sufficient to accomplish the desired result. In practice the mass is reduced by means of the pressure and during the process of vulcanizing, to approximately one-fourth or even one-fifth of the original normal bulk of the mass before compression. The pressure sufficient to maintain the mass in this highly compressed condition is maintained, by preference, during the vulcanizing, and also during the cooling of the material, or until the material thus compressed in a plastic condition is allowed to cool and set and harden. The body of the finished article is thus exceedingly dense, compact and strong.

The temperature should be maintained, by preference, at or above 250° F., and below 600° F.; and such temperature and required pressure should be maintained for thirty minutes, or thereabout, the pressure being continued, as already suggested, during the cooling of the material, or for any desired period in excess of the period of time during which the vulcanizing is accomplished.

When remnants or fragments of asbestos cloth or fabric, or similar material is used, such material or remnants may be found to contain a quantity of metal which is ordinarily in the form of copper or brass wire, or similar particles of metal to the extent of 2%, more or less, of the mass of fibrous material, or any desired proportion of metal in a finely divided condition may be added to the original mass of fibrous material, or to the pulp comprising fibrous material and a binder, or binder and filler of any desired material. In such cases the copper or metal is finely ground or disintegrated so as to consist of exceedingly small particles which, by preference, should not exceed in size the particles of ordinary metal filings, although they may be in the form of fine powder, or the particles or grains may be of any desired degree of coarseness. The metallic particles or grains are, by preference, imbedded in the mass and surrounded by and in close adhesive contact with the fibrous material and binder, or mass of non-metallic material with which the metallic material is associated.

Articles containing the foregoing elements without any, or with a very small proportion of metal thus intermixed with the non-metallic material or composition, are adapted to be used when the electrical conductivity, or non-conductivity of the material or body is comparatively unimportant; but the non-metallic elements should be used without the admixture of any metal, when the article or body is to be a non-conductor of electricity. And, from the foregoing, it will be readily understood that the brake shoe, or lining may be made wholly of non-metallic elements intermixed, molded, or compressed and vulcanized in the manner described, and provided with inserts of graphite, plumbago, or sectile carbon, or a carbon-containing composition or material as hereinafter described.

In making a brake, brake-shoe, or brake band $a$, or similar device, or article of manufacture, in accordance with my invention, I provide a metallic brake body which may be in the form of a flexible metallic brake band $a'$, or similar brake member of any desired type. And any desired number of brake blocks, shoes, friction members or lining members $b$ are provided, each formed, by preference, of the composition of material, or compound above described, and molded, compressed, subjected to heat, and vulcanized under pressure, and allowed to cool and set and harden, by preference, substantially as above described.

Each of the shoes, friction members or lining members $b$ is provided with a series of openings 2, formed therein either during the operation of molding and vulcanizing the same, or in any ordinary and well known or suitable manner, during or after the completion of the operation of compressing, molding, forming, heating, vulcanizing and hardening the main body formed as above described. The holes 2 may be either cored or bored, or otherwise formed in the members $b$, and are, by preference disposed in staggered relation to each other, and suitably spaced apart, so that the inner extremities or mouths of the openings 2 are in the inner friction surfaces 3 of the shoe or lining members 2, and the rims or margins of the inner extremities of the openings are flush with the inner friction surfaces of said brake shoe or lining members $b$, and in such staggered relation to each other throughout the entire inner friction surfaces of said lining members that the friction surfaces will wear evenly, and the engaged friction surface of the drum or brake wheel member in frictional engagement with which the brake-shoe or lining members $b$ are held, when the device is in operation, will wear away evenly and uniformly throughout the entire area of such frictionally engaged surfaces. A multiplicity of molded or cast, or otherwise formed, inserts or pins 4, formed of graphite, plumbago, or sectile carbon, or what is commonly known as black lead, or of a composition containing graphite or carbon, and with or without a filler or binder of any suitable material adapted to adhesively engage the walls of the openings, or the body of the brake shoe members $b$, so as to hold the inserts or pins in place,—are inserted into and in snugly fitting, and preferably adhesive engagement with the walls of the openings 2, so as to completely fill each and all of the openings, and form substantially integral or fixed and permanently attached parts, or inserts in the main body portions of said brake shoe members or lining members b. The inner ends of these inserts or graphite pins 4 are flush with the inner friction surface of the lining or shoe member b of which they form a part, and are adapted to wear away with the friction surface of said shoe or lining members b, so as to be at all times substantially flush with said friction surface, and provide sufficient lubrication for said surface, to enable the desired and necessary friction to be obtained between the friction surfaces of the brake lining and the friction surface engaged thereby, to cause the brake to operate in an efficient manner without cutting or unnecessarily wearing away the engaged surfaces or either of them, to the detriment or injury of the parts. The material of which the graphite inserts or pins are formed is of sufficient hardness to prevent them from wearing away to such an extent or with such rapidity as to lubricate the friction surfaces to excess, or in a manner which will interfere with the efficient operation of the device, or the desired degree of frictional engagement of the inner surfaces of the members b, with the relatively movable friction surface engaged thereby; but these graphite inserts or pins are adapted to afford only so much lubrication as is desirable or necessary to prevent cutting or scoring, or unnecessary and avoidable wearing away of either or both of the engaged friction surfaces, when the device is in operation. In other words, the lubrication thus obtained is not sufficient to cause or permit any undesirable slipping of the engaged relatively movable friction surfaces, but is only sufficient to prevent undue wearing away or cutting of the surfaces of the frictionally engaged parts with which the inner or exposed ends of the graphite pins or inserts 4 are in contact when the device is in operation.

It will be readily understood, from the foregoing, that, although I prefer to employ the graphite inserts or pins 4 in combination with brake shoes or lining members b formed of a composition, or of material such as that herein described, I contemplate using such pins or inserts, and they are adapted to be used in brake-shoes, linings, or friction members, which may be formed of metal, or of any desired suitable material adapted to be employed in an efficient manner for the uses and purposes in connection with which brake-bands, brake-shoes, brake linings, or similar friction members are adapted or intended to be used.

In the form of brake band shown in the drawings, each segmental lining member of block b is provided with a suitable number of apertures c therein, as shown in Fig. 2; and headed bolts e are inserted through the openings c, with the heads of the bolts, by preference, in said openings, said bolts extending through suitable corresponding openings f in the brake band or outer metallic brake member a', and having nuts g in threaded engagement with the threaded ends of said bolts, so as to securely hold the sectional lining members b in position. The inner concave friction face 3 of each section b is concave, forming a segment of a circle corresponding with the peripheral surface of the wheel or part to which the brake is to be applied; and the outer faces of the lining members b are curved to correspond with the curvature of the band a'. The lining members b are spaced apart sufficiently to permit the desired flexibility of the brake band or device of which they form the lining or friction members. One end of the band a' is provided with a rod k, secured to the flexible band by means of rivets l, or in any suitable manner; and the opposite end of the flexible band a' has an adjustable rod or threaded pin m connected therewith, the same being mounted in threaded engagement with a lug or threaded boss n, upon said brake band. The boss n has a curved perforated base o fixed to the flexible band a' by means of bolts p and nuts q, as shown in Fig. 1, or in any desired ordinary manner. The pin n is provided with threaded nuts r and s in threaded engagement therewith on opposite sides of the lug; and washers t may be interposed between said nuts and said boss. Jam nuts u are shown mounted in engagement with the nuts r and s. The rod k has an eye v' in its free end; and the rod m has a similar eye or aperture w. By this means the rods k and m are adapted to be operatively connected with suitable operating levers or operating mechanism for setting and releasing the brake. The operating levers may be of any desired ordinary and well known or suitable form, and it is deemed unnecessary to describe such operating mechanism or levers, as their construction and operation are well known and familiar to those skilled in the art to which this invention relates.

One or any desired number of graphite pins or inserts may be in the form of a graphite pin or inserted member 5, such as is shown in Figs. 6 and 7. The graphite insert 5 extends transversely across the inner friction surface of the shoe member b, in a transverse groove which is of such form and dimensions as to prevent the graphite member or insert from coming out. The graphite pin 5 fits tightly in this transverse groove, which, by preference, is open on one side, and has the longitudinal marginal edges of its longitudinal opening spaced apart sufficiently to expose the graphite inserted in the groove, but the mouth of the opening along the friction surface of the shoe lining or friction member is narrower than the groove is wide, and the inserted graphite member is wider transversely than is the mouth of the opening or openings which may be of any suitable form and dimensions.

I claim:

1. In a device of the class described, a friction shoe member formed of a composition containing asbestos and having a friction surface provided with an aperture therein, and a lubricating member formed of a material containing a lubricant inserted in said aperture, for lubricating said friction surface.

2. In a device of the class described, a friction shoe member formed of a composition containing asbestos and having a friction surface provided with an aperture therein, and a lubricating member containing graphite inserted in said aperture, for lubricating said friction surface.

3. In a device of the class described, a friction shoe member formed of a composition containing asbestos and provided with a friction surface, said friction shoe member having a series of apertures in said friction surface, and a series of lubricating members containing graphite inserted in said apertures, for lubricating said surface.

4. In a device of the class described, a friction shoe member formed of a composition comprising in combination, fibrous asbestos, a cementitious material containing rubber and sulphur, all intermixed together and compressed and vulcanized, and having a friction surface provided with a series of apertures therein, and a series of inserted members containing a lubricant mounted in said apertures in said friction surface.

5. In a device of the class described, a friction shoe member formed of a composition comprising in combination, fibrous asbestos, rubber and sulphur, all intermixed together and compressed and vulcanized, and having a friction surface provided with an aperture therein, and a graphite member inserted in said aperture and having an exposed surface flush with the friction surface of the main body of such friction shoe member.

6. In a device of the class described, a friction shoe member formed of a composition containing, in combination, fibrous asbestos, and a cementitious material containing rubber and sulphur all intermixed together and compressed and vulcanized, and having a friction surface provided with a series of apertures, and a series of lubricating members formed of graphite and inserted in said apertures and having their exposed surfaces flush with the friction surface of said composition friction shoe member.

7. In a device of the class described, a friction shoe member formed of a composition comprising in combination, fibrous asbestos, and a cementitious material containing rubber and sulphur, all intermixed together and compressed and vulcanized, and provided with an aperture in the friction surface of such shoe member, and an insert containing graphite fitted in said aperture and having the exposed end of such insert flush with the friction surface of said friction shoe member.

8. In a device of the class described, a friction shoe member formed of a composition comprising in combination, fibrous asbestos, cementitious material containing rubber and sulphur and a filler, all intermixed together and compressed and vulcanized, and provided with a series of apertures in the friction surface of said friction shoe member, and a series of graphite pins fitted tightly in said apertures and having the exposed ends of said pins flush with said friction surface of the main body of the friction shoe member.

Dated at Chicago, Illinois, this 20th day of April, 1921.

FRANK A. HEADSON.

Witnesses:
HARRY I. CROMER,
HILDUR E. WICKSTROM.